(12) United States Patent
Ulrey et al.

(10) Patent No.: US 11,136,944 B2
(45) Date of Patent: Oct. 5, 2021

(54) BLOWDOWN RUNNER WASTEGATE FOR A SPLIT EXHAUST ENGINE SYSTEM

(71) Applicant: Ford Global Technologies, LLC, Dearborn, MI (US)

(72) Inventors: Joseph Ulrey, Dearborn, MI (US); James Randall Leiby, Dryden, MI (US); Gregory McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 15/886,651

(22) Filed: Feb. 1, 2018

(65) Prior Publication Data

US 2019/0234349 A1 Aug. 1, 2019

(51) Int. Cl.
*F02M 26/02* (2016.01)
*F02M 26/13* (2016.01)
*F02M 26/51* (2016.01)
*F02B 37/18* (2006.01)

(52) U.S. Cl.
CPC ............ *F02M 26/02* (2016.02); *F02B 37/18* (2013.01); *F02M 26/13* (2016.02); *F02M 26/51* (2016.02)

(58) Field of Classification Search
CPC ........ F02M 26/02; F02M 26/13; F02M 26/51; F02B 37/18
USPC ...................................................... 123/58.7
See application file for complete search history.

(56) References Cited

U.S. PATENT DOCUMENTS

| 9,080,523 | B1 * | 7/2015 | Ulrey | |
|---|---|---|---|---|
| 2012/0060492 | A1 * | 3/2012 | Pursifull | |
| 2016/0032869 | A1 * | 2/2016 | Boyer | F02D 17/02 123/568.11 |
| 2017/0248056 | A1 * | 8/2017 | Styles | F01N 5/02 |

OTHER PUBLICATIONS

Ulrey, J. et al., "Systems and Methods for a Split Exhaust Engine System," U.S. Appl. No. 15/382,457, filed Dec. 16, 2016, 109 pages.
Ulrey, J. et al., "Systems and Methods for a Split Exhaust Engine System," U.S. Appl. No. 15/382,458, filed Dec. 16, 2016, 112 pages.
Ulrey, J. et al., "Systems and Methods for a Split Exhaust Engine System," U.S. Appl. No. 15/382,477, filed Dec. 16, 2016, 109 pages.

(Continued)

*Primary Examiner* — Lindsay M Low
*Assistant Examiner* — Omar Morales
(74) *Attorney, Agent, or Firm* — Geoffrey Brumbaugh; McCoy Russell LLP

(57) ABSTRACT

Methods and systems are provided for split exhaust engine system including a blowdown exhaust manifold coupled to an exhaust passage and a scavenge exhaust manifold coupled to an intake passage. In one example, a turbine wastegate couples a single exhaust runner out of a plurality of exhaust runners of the blowdown exhaust manifold to an exhaust passage, downstream of a turbocharger turbine. Additionally, the turbine wastegate may couple the single exhaust runner to the exhaust passage, downstream of the turbocharger turbine arranged in the exhaust passage.

17 Claims, 3 Drawing Sheets

(56) References Cited

OTHER PUBLICATIONS

Ulrey, J. et al., "Systems and Methods for a Split Exhaust Engine System," U.S. Appl. No. 15/382,479, filed Dec. 16, 2016, 111 pages.

Ulrey, J. et al., "Systems and Methods for a Split Exhaust Engine System," U.S. Appl. No. 15/382,484, filed Dec. 16, 2016, 112 pages.

Ulrey, J. et al., "Systems and Methods for a Split Exhaust Engine System," U.S. Appl. No. 15/382,485, filed Dec. 16, 2016, 109 pages.

Leone, T. et al., "Systems and Methods for a Split Exhaust Engine System," U.S. Appl. No. 15/382,489, filed Dec. 16, 2016, 109 pages.

Ulrey, J. et al., "Systems and Methods for a Split Exhaust Engine System," U.S. Appl. No. 15/382,494, filed Dec. 16, 2016, 109 pages.

Ulrey, J. et al., "Systems and Methods for a Split Exhaust Engine System," U.S. Appl. No. 15/382,500, filed Dec. 16, 2016, 109 pages.

Ulrey, J. et al., "Systems and Methods for a Split Exhaust Engine System," U.S. Appl. No. 15/382,504, filed Dec. 16, 2016, 112 pages.

Ulrey, J., et al., "Systems and Methods for a Split Exhaust Engine System," U.S. Appl. No. 15/382,506, filed Dec. 16, 2016, 109 pages.

Ulrey, J. et al., "Systems and Methods for a Split Exhaust Engine System," U.S. Appl. No. 15/382,509, filed Dec. 16, 2016, 109 pages.

Ulrey, J. et al., "Systems and Methods for a Split Exhaust Engine System," U.S. Appl. No. 15/382,520, filed Dec. 16, 2016, 112 pages.

Ulrey, J. et al., "Systems and Methods for a Split Exhaust Engine System," U.S. Appl. No. 15/382,532, filed Dec. 16, 2016, 111 pages.

Boyer, B. et al., "Systems and Methods for a Split Exhaust Engine System," U.S. Appl. No. 15/382,538, filed Dec. 16, 2016, 112 pages.

Ulrey, J. et al., "Systems and Methods for a Split Exhaust Engine System," U.S. Appl. No. 15/382,548, filed Dec. 16, 2016, 111 pages.

Ulrey, J. et al., "Systems and Methods for a Split Exhaust Engine System," U.S. Appl. No. 15/382,549, filed Dec. 16, 2016, 113 pages.

Ulrey, J. et al., "Systems and Methods for a Split Exhaust Engine System," U.S. Appl. No. 15/382,556, filed Dec. 16, 2016, 112 pages.

Ulrey, J. et al., "Systems and Methods for a Split Exhaust Engine System," U.S. Appl. No. 15/382,559, filed Dec. 16, 2016, 112 pages.

\* cited by examiner

BLOWDOWN RUNNER WASTEGATE FOR A SPLIT EXHAUST ENGINE SYSTEM

FIELD

The present description relates generally to methods and systems for a split exhaust engine including exhaust gas recirculation.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that utilizing an engine system with a split exhaust system, where a first exhaust manifold routes exhaust gas recirculation (EGR) to an intake of the engine, upstream of a compressor of the turbocharger, and where a second exhaust manifold routes exhaust to a turbine of the turbocharger in an exhaust of the engine, may decrease knock and increase engine efficiency. In such an engine system, each cylinder may include two intake valves and two exhaust valves, where a first set of cylinder exhaust valves (e.g., blowdown exhaust valves) exclusively coupled to the first exhaust manifold may be operated at a different timing than a second set of cylinder exhaust valves (e.g., scavenge exhaust valves) exclusively coupled to the second exhaust manifold, thereby isolating a blowdown portion and scavenging portion of exhaust gases. The timing of the second set of cylinder exhaust valves may also be coordinated with a timing of cylinder intake valves to create a positive valve overlap period where fresh intake air (or a mixture of fresh intake air and EGR), referred to as blow-through, may flow through the cylinders and back to the intake, upstream of the compressor, via an EGR passage coupled to the second exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while improving the turbine's work efficiency and engine torque.

However, the inventors herein have recognized potential issues with such systems. As one example, under certain operating conditions such as high engine speeds, increased exhaust gas may flow through the first exhaust manifold to the turbine of the turbocharger, thereby driving an increase in the speed, boost pressure and temperature of the compressor. Degradation of the compressor may occur if a gas temperature of gases entering the compressor and/or the speed of the compressor increases above threshold levels. The inventors herein have recognized that coupling a wastegate to a blowdown exhaust path may control turbine speed and boost pressure. The wastegate may be arranged just prior to the turbine where the exhaust runners of the blowdown exhaust path merge into one or two passages depending on whether the turbocharger utilizes a single turbine or twin scroll turbines. As such, in a traditional turbocharged engine with a single exhaust manifold, the operation of the wastegate is adapted to maintain equality between cylinders with regards to combustion processes such as knock, burn rate, exhaust temperature, etc., and well as amounts of residual gas.

However, the inventors herein have also recognized that the location of the wastegate upstream of the turbine where blowdown exhaust path runners join may impose increased costs. For example, by positioning the wastegate adjacent to the turbine, the wastegate is formed from a same material as the turbine housing. However, the material of the turbine housing may comprise expensive, high nickel content stainless steel to allow the turbine housing to withstand high temperatures.

In one example, the issues described above may be addressed by a system for an engine, comprising a first set of exhaust valves fluidly coupled to an exhaust passage including a turbocharger turbine, upstream of the turbocharger turbine, via a plurality of exhaust runners, a wastegate valve positioned in a passage coupled between a single exhaust runner of the plurality of exhaust runners and the exhaust passage, downstream of the turbocharger turbine, and a second set of exhaust valves fluidly coupled to an intake passage upstream of the turbocharger compressor. As a result of this positioning of the wastegate valve in the system, lower cost materials may be used for the wastegate valve and wastegate passage. Additionally, the wall area and flow path of the wastegate passage may allow more heat to be retained in the gas and delivered to the exhaust catalyst as compared to a wastegate placed in the turbine housing.

As one example, the wastegate of the blowdown exhaust path may be coupled to a single exhaust runner (coupled to a single cylinder) rather than a merging region of all the exhaust runners (each exhaust runner coupled to a different cylinder). In this position, the wastegate may be exposed to reduced temperatures and may be formed from a lower cost material. Separation of the wastegate from the turbine may provide flexibility in positioning of the wastegate according to available space in the engine compartment. Furthermore, by removing the wastegate from the turbine housing, the amount of material used for the turbine housing is reduced, thereby decreasing the amount of material that absorbs heat and hinders the thermal activation, e.g., light-off, of the catalyst of an emission control device, downstream of the turbine. As a result, a time period for sufficient heating of catalyst may be shortened.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
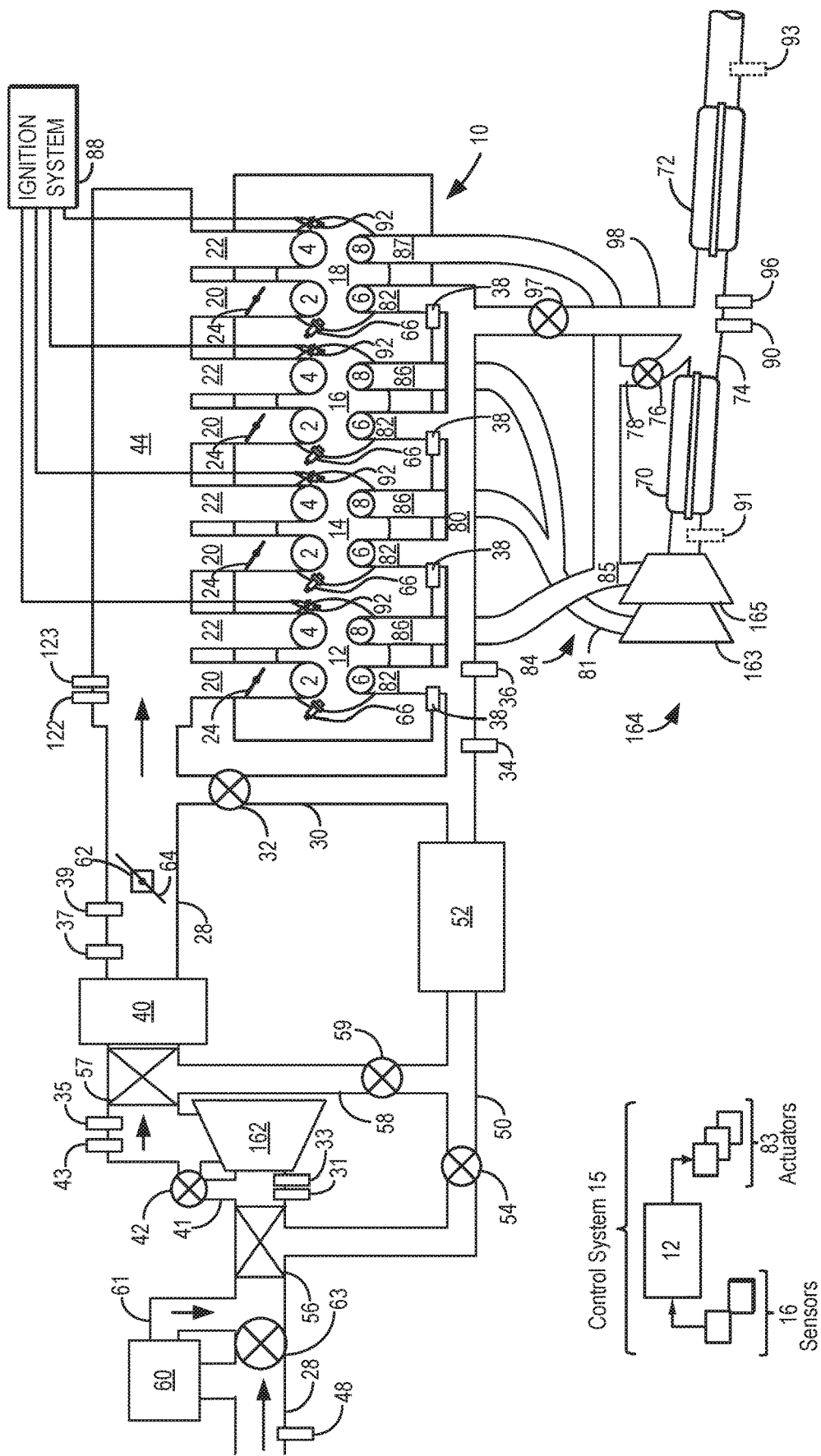
FIG. 1 shows a schematic depiction of a turbocharged engine system with a split exhaust system.
Figure 2:
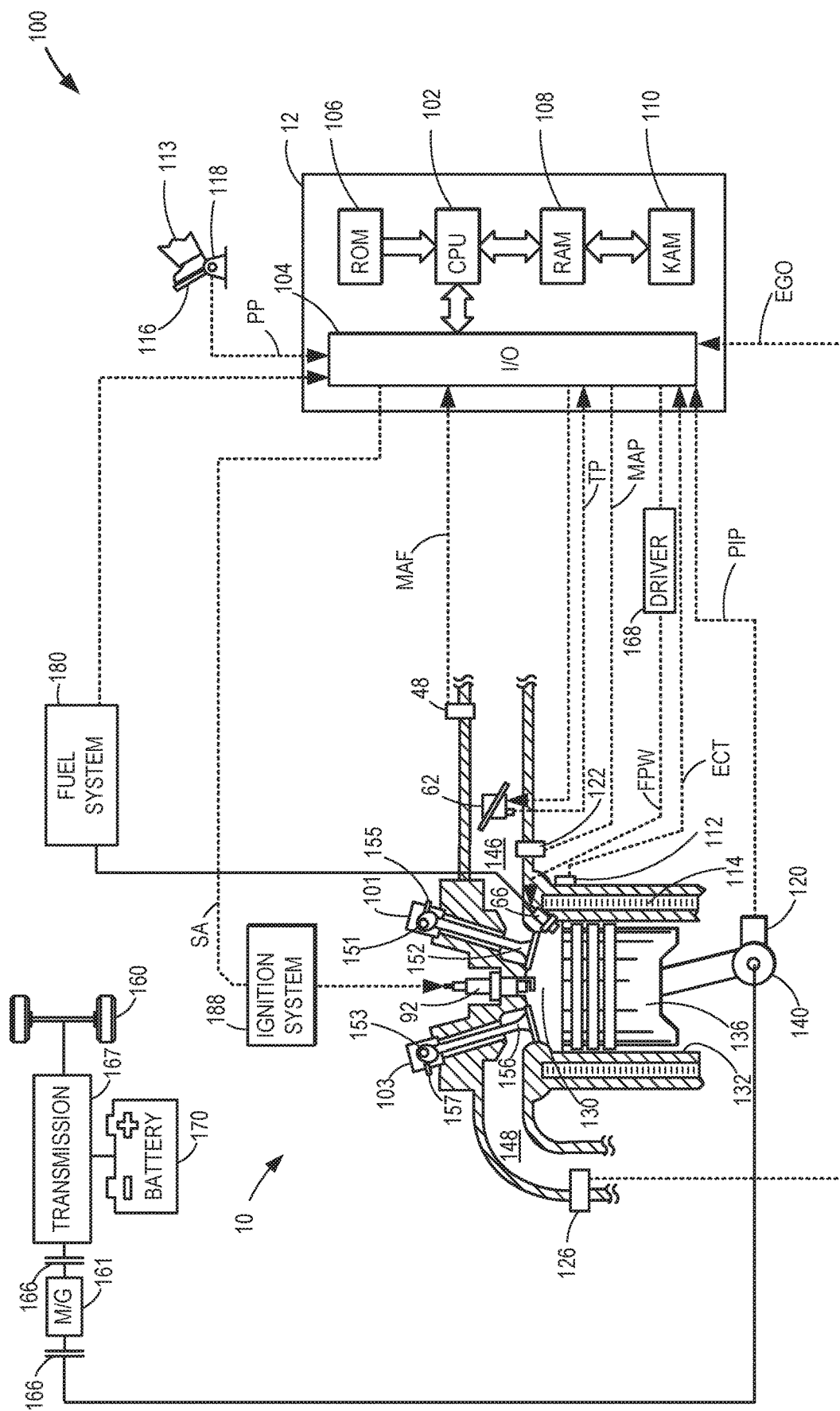
FIG. 2 shows an embodiment of a cylinder of the engine system of FIG. 1.

The following description relates to systems and methods for operating a split exhaust engine with blowthrough and exhaust gas recirculation (EGR) to an intake via a first exhaust manifold. As shown in FIG. 1, the split exhaust engine may include a first exhaust manifold (referred to herein as a blowdown exhaust manifold) coupled exclusively to a blowdown exhaust valve of each cylinder. The blowdown manifold is coupled to an exhaust passage of the engine, where the exhaust passage includes a turbocharger turbine and one or more emission control devices (which may include one or more catalysts). In some embodiments, the split exhaust passage may include a blowdown wastegate coupling one exhaust runner, channeling gas from the blowdown exhaust valve of one cylinder, to an exhaust passage downstream of a first emission control device and upstream of a second emission control device. The split exhaust engine also includes a second exhaust manifold (referred to herein as a scavenge exhaust manifold) coupled exclusively to a scavenge exhaust valve of each cylinder. The scavenge manifold is coupled to the intake passage, upstream of a turbocharger compressor, via a first EGR passage including a first EGR valve (referred to herein as a blow-through combustion cooling (BTCC) valve). Additionally, in some embodiments, the split exhaust engine system may include various valve actuation mechanisms and may be installed in a hybrid vehicle, as shown in FIG. 2. An engine controller may be configured to operate the blowdown wastegate, such as in the example routine of FIG. 3, in response to certain engine operating conditions.

Cylinder balance is maintained in spite of the coupling of the blowdown wastegate to only one exhaust runner due to a configuration of the split exhaust engine, where cylinder symmetry may be regulated by the scavenge manifold flowing residual gases from engine cylinders. In this way, the blowdown wastegate, also referred to as a turbine wastegate, may be coupled to a single exhaust runner of the blowdown exhaust manifold without adversely affecting operation of the split exhaust engine. A position (e.g., open or closed) of the blowdown wastegate may adjust exhaust manifold pressure by providing a path for exhaust gas from the exhaust runner of the blowdown exhaust manifold to the exhaust passage upstream of the second emission control device rather than coupling to each blowdown exhaust runner.

As an example, in an engine system with a single exhaust manifold, the position of the turbine wastegate is modulated to affect pressure at all cylinders equally, thus the turbine wastegate is coupled to all exhaust runners from each cylinder and arranged immediately upstream of the turbine. The pressure in the exhaust manifold determines the residual exhaust gas amount in each cylinder. If the wastegate of the single manifold were coupled to a single exhaust runner, the exhaust manifold pressure near the wastegate would be lower than the pressure far from the wastegate. In this way, cylinders close to the wastegate would experience lower residual exhaust gas amounts compared to cylinders far from the wastegate. However, in the split exhaust engine described herein, the scavenge manifold, coupled to all cylinders, determines the cylinder pressure at the time the scavenge exhaust valves are open. All cylinders experience similar manifold pressure in the scavenge exhaust manifold and therefore each cylinder has similar residual exhaust gas at the time the scavenge valve closes. Additionally, the scavenge manifold may control cylinder pressure via a scavenge manifold bypass valve (SMBV) that couples the scavenge manifold to an exhaust passage where exhaust gas may be released to the atmosphere after treatment by an emission control device to adjust a pressure of the scavenge manifold. Cylinder pressure is equalized amongst all cylinders due to the coupling of the scavenge manifold to each cylinder. Thus, the turbine wastegate may be distanced from the turbine and no longer coupled to each exhaust runner of the blowdown exhaust manifold without adversely affecting cylinder balance, as described further below.

By positioning the blowdown wastegate away from the turbine, a size of the blowdown wastegate may be decreased, thereby reducing packaging constraints of the engine system. The blowdown wastegate may be formed from a different material than the turbine housing that may be less costly. Furthermore, a catalyst of an emission control device may be activated faster due to reduced heat-absorbing material positioned between the blowdown wastegate and the emission control device.

In the following description, a valve being operational or activated indicates that it is opened and/or closed according to determined timings during the combustion cycle for a given set of conditions. Likewise, a valve being deactivated or inoperative indicates that the valve is maintained closed, unless otherwise stated.

FIG. 1 shows a schematic diagram of a multi-cylinder internal combustion engine 10, which may be included in a propulsion system of an automobile. Engine 10 includes a plurality of combustion chambers (i.e., cylinders) which may be capped on the top by a cylinder head (not shown). In the example shown in FIG. 1, engine 10 includes cylinders 12, 14, 16, and 18, arranged in an inline-4 configuration. It should be understood, however, that though FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as described further below. Each of cylinders 12, 14, 16, and 18 include two intake valves, including first intake valve 2 and second intake valve 4, and two exhaust valves, including first exhaust valve (referred to herein as a blowdown exhaust valve, or blowdown valve) 8 and second exhaust valve (referred to herein as a scavenge exhaust valve, or scavenge valve) 6. The intake valves and exhaust valves may be referred to herein as cylinder intake valves and cylinder exhaust valves, respectively. As explained further below with reference to FIG. 2, a timing (e.g., opening timing, closing timing, opening duration, etc.) of each of the intake valves may be controlled via various camshaft timing systems. In one embodiment, both the first intake valves 2 and second intake valves 4 may be controlled to a same valve timing (e.g., such that they open and close at the same time in the engine cycle). In an alternate embodiment, the first intake valves 2 and second intake valves 4 may be controlled at a different valve timing. Further, the first exhaust valves 8 may be controlled at a different valve timing than the second exhaust valves 6 (e.g., such that a first exhaust valve and second exhaust valve of a same cylinder open at different times than one another and close at different times than one another), as discussed further below.

Each cylinder receives intake air (or a mixture of intake air and recirculated exhaust gas, as explained further below) from an intake manifold 44 via an air intake passage 28. Intake manifold 44 is coupled to the cylinders via intake ports (e.g., runners). For example, intake manifold 44 is shown in FIG. 1 coupled to each first intake valve 2 of each cylinder via first intake ports 20. Further, the intake manifold 44 is coupled to each second intake valve 4 of each cylinder via second intake ports 22. In this way, each cylinder intake port can selectively communicate with the cylinder it is coupled to via a corresponding one of the first intake valves 2 or second intake valves 4. Each intake port may supply air and/or fuel to the cylinder it is coupled to for combustion.

One or more of the intake ports may include a charge motion control device, such as a charge motion control valve (CMCV). As shown in FIG. 1, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1, each CMCV 24 may include a valve plate; however, other configurations of the valve are possible. Note that for the purposes of this disclosure the CMCV 24 is in the "closed" position when it is fully activated and the valve plate may be fully tilted into the respective first intake port 20, thereby resulting in maximum air charge flow obstruction. Alternatively, the CMCV 24 is in the "open" position when deactivated and the valve plate may be fully rotated to lie substantially parallel with airflow, thereby considerably minimizing or eliminating airflow charge obstruction. The CMCVs may principally be maintained in their "open" position and may only be activated "closed" when swirl conditions are desired. As shown in FIG. 1, only one intake port of each cylinder includes the CMCV 24. However, in alternate embodiments, both intake ports of each cylinder may include a CMCV 24. The controller 12 may actuate the CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active), as explained further below. As referred to herein, blowthrough air or blowthrough combustion cooling may refer to intake air that flows from the one or more intake valves of each cylinder to second exhaust valves 6 (and into second exhaust manifold 80) during a valve opening overlap period between the intake valves and second exhaust valves 6 (e.g., a period when both the intake valves and second exhaust valves 6 are open at the same time), without combusting the blowthrough air.

A high pressure, dual stage, fuel system (such as the fuel system shown in FIG. 2) may be used to generate fuel pressures at injectors 66. As such, fuel may be directly injected in the cylinders via injectors 66. Distributorless ignition system 88 provides an ignition spark to cylinders 12, 14, 16, and 18 via sparks plug 92 in response to controller 12. Cylinders 12, 14, 16, and 18 are each coupled to two exhaust ports for channeling the blowdown and scavenging portions of the combustion gases separately. Specifically, as shown in FIG. 1, cylinders 12, 14, 16, and 18 exhaust combustion gases (e.g., scavenging portion) to second exhaust manifold (referred to herein as a scavenge manifold) 80 via second exhaust runners (e.g., ports) 82 and combustion gases (e.g., blowdown portion) to first exhaust manifold (referred to herein as a blowdown manifold) 84 via first exhaust runners (e.g., ports) 86, 87. Second exhaust runners 82 extend from cylinders 12, 14, 16, and 18 to second exhaust manifold 80. Additionally, first exhaust manifold 84 includes a first manifold portion 81 and second manifold portion 85. First exhaust runners 86, 87 of cylinders 12 and 18 (referred to herein as the outside cylinders) extend from cylinders 12 and 18 to the second manifold portion 85 of first exhaust manifold 84. Additionally, first exhaust runners 86 of cylinders 14 and 16 (referred to herein as the inside cylinders) extend from cylinders 14 and 16 to the first manifold portion 81 of first exhaust manifold 84.

Each exhaust runner can selectively communicate with the cylinder it is coupled to via an exhaust valve. For example, second exhaust runners 82 communicate with their respective cylinders via second exhaust valves 6 and first exhaust runners 86, 87 communicate with their respective cylinders via first exhaust valves 8. Second exhaust runners 82 are isolated from first exhaust runners 86, 87 when at least one exhaust valve of each cylinder is in a closed position. Exhaust gases may not flow directly between exhaust runners 82 and first exhaust runners 86, 87. The exhaust system described above may be referred to herein as a split exhaust manifold system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another and thus the first and second portions of exhaust gases do not mix with one another within the first and second exhaust manifolds).

Engine 10 includes a turbocharger including a dual-stage exhaust turbine 164 and an intake compressor 162 coupled on a common shaft. Dual-stage turbine 164 includes a first turbine 163 and second turbine 165. First turbine 163 is directly coupled to first manifold portion 81 of first exhaust manifold 84 and receives exhaust gases only from cylinders 14 and 16 via first exhaust valves 8 of cylinders 14 and 16. Second turbine 165 is directly coupled to second manifold portion 85 of first exhaust manifold 84 and receives exhaust gases only from cylinders 12 and 18 via first exhaust valves 8 of cylinders 12 and 18. Rotation of first and second turbines drives rotation of compressor 162 disposed within the intake passage 28. As such, the intake air becomes boosted (e.g., pressurized) at the compressor 162 and travels downstream to intake manifold 44. Exhaust gases exit both first turbine 163 and second turbine 165 into common exhaust passage 74. While it is depicted as two turbines, 163 and 165, turbine 164 may consist of a single turbine wheel fed by two turbine scrolls or passages that introduce gas to different portions of the turbine wheel. For instance the two scrolls may each introduce gas around the entire perimeter of the wheel, but at different axial locations (commonly known as a twin scroll turbine). Alternately, the two scrolls may each introduce gas to the turbine over a portion of the perimeter such as approximately 180 degrees. Alternately, turbine 164 may be a single monoscroll turbine in which exhaust gas from all cylinders combine before entering the single turbine scroll.

A wastegate, also referred to as a blowdown wastegate, may be coupled to first exhaust manifold 84 in one of the first exhaust runners (specifically, exhaust runner 87) of one of the first exhaust valves 8 of cylinder 18 and not couple to any other of the first exhaust runners 86. Specifically, blowdown wastegate valve 76 (hereafter, BDWG 76) may be included in a bypass 78 coupling at a first end of bypass 78 to one of the first exhaust runners 87 of one of the first exhaust valves 8 of cylinder 18 and at a second end to exhaust passage 74. The second end of bypass 78 may merge with a flow passage 98 of second exhaust manifold 80 at a region along exhaust passage 74 in between a first emission control device 70 and a second emission control device 72, as shown in FIG. 1, or, alternatively, between turbine 164 and emission control device 70. When BDWG 76 is in a closed position, exhaust gas flowing into first exhaust manifold 84 is directed to turbine 164 (and blocked through bypass 78). However, when BDWG 76 is opened, including a fully open position and any position between fully open and closed, a portion of the exhaust gas flowing into first exhaust manifold 84 may be channeled through bypass 78 to exhaust passage 74, thus decreasing the amount of exhaust gas delivered to dual-stage turbine 164. Specifically, when BDWG is open, or at least partially open, at least some of the exhaust gas from single exhaust runner 87 is channeled through bypass 78, away from the dual-stage turbine 164, and to the exhaust passage 74, downstream of the first emission control device 70 and upstream of the second emission control device 72. Also, a portion of exhaust gas from cylinder 12 flowing into the second manifold portion 85 may flow toward exhaust runner 87 and into bypass 78 through the BDWG 76. In this way, a position of BDWG 76 controls an amount of boost provided by the turbocharger. For example, by increasing the amount of opening of the BDWG 76 (e.g., from closed to open or partially open), the speed of the turbine and thus the compressor is decreased, thereby decreasing boost. In alternate embodiments, engine 10 may include a single stage turbine where all exhaust gases from the first exhaust manifold 84 are directed to an inlet of a same turbine. Furthermore, it will be appreciated that the embodiment of engine 10 shown in FIG. 1 is a non-limiting example of the engine and other examples may include the BDWG 76 adapted to be coupled exclusively to another exhaust runner of the first exhaust runners 86.

Exhaust gases exiting dual-stage turbine 164 flow downstream in exhaust passage 74 to first emission control device 70 and second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way type catalysts. In other examples, emission control devices 70 and 72 may include one or a plurality of a diesel oxidation catalyst (DOC), and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12 of control system 15, as described further below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as second oxygen sensor 91 positioned between dual-stage turbine 164 and first emission control device 70 and/or third oxygen sensor 93 positioned downstream of second emission control device 72. As such, second oxygen sensor 91 may be configured to measure the oxygen content of the exhaust gas entering first emission control device 70 and third oxygen sensor 93 may be configured to measure the oxygen content of exhaust gas exiting second emission control device 72. In one embodiment, the one or more oxygen sensor 90, 91, and 93 may be Universal Exhaust Gas Oxygen (UEGO) sensors. Alternatively, a two-state exhaust gas oxygen sensor may be substituted for oxygen sensors 90, 91, and 93. Exhaust passage 74 may include various other sensors, such as one or more temperature and/or pressure sensors. For example, as shown in FIG. 1, a pressure sensor 96 is positioned within exhaust passage 74, between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where flow passage 98 and bypass 78 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as the scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor (e.g., turbocharger compressor) 162 (and thus may be referred to as a low-pressure EGR passage). As such, exhaust gases (or blowthrough air, as explained further below) is directed from second exhaust manifold 80 to intake passage 28, upstream of compressor 162, via first EGR passage 50. As shown in FIG. 1, first EGR passage 50 may include an EGR cooler 52 configured to cool exhaust gases flowing from second exhaust manifold 80 to intake passage 28 and a first EGR valve 54 (which may be referred to herein as the BTCC valve). Controller 12 is configured to actuate and adjust a position of the BTCC valve 54 in order to control an amount of air flow through first EGR passage 50. When the BTCC valve 54 is in a closed position, no exhaust gases or intake air may flow from second exhaust manifold 80 to intake passage 28, upstream of compressor 162. Further, when the BTCC valve 54 is in an open position, exhaust gases and/or blowthrough air may flow from second exhaust manifold 80 to intake passage 28, upstream of compressor 162. Controller 12 may additionally adjust the BTCC valve 54 into a plurality of positions between fully open and fully closed. In alternate embodiments, controller 12 may only adjust BTCC valve 54 to be either fully open or fully closed.

A first ejector 56 is positioned at an outlet of EGR passage 50, within intake passage 28. First ejector 56 may include a constriction or venturi that provides a pressure increase at the inlet of the compressor 162. As a result, EGR from the EGR passage 50 may be mixed with fresh air flowing through the intake passage 28 to the compressor 162. Thus, EGR from the EGR passage 50 may act as the motive flow on the first ejector 56. In an alternate embodiment, there may not be an ejector positioned at the outlet of EGR passage 50. Instead, an outlet of compressor 162 may be shaped as an ejector that lowers the gas pressure to assist in EGR flow (and thus, in this embodiment, air is the motive flow and EGR is the secondary flow). In yet another embodiment, EGR from EGR passage 50 may be introduced at the trailing edge of a blade of compressor 162, thereby allowing blowthrough air to intake passage 28 via EGR passage 50.

A second EGR passage 58 is coupled between first EGR passage 50 and intake passage 28. Specifically, as shown in FIG. 1, second EGR passage 58 is coupled to first EGR passage 50, between the BTCC valve 54 and EGR cooler 52. In alternate embodiments, when second EGR passage 58 is included in the engine system, the system may not include EGR cooler 52. Additionally, second EGR passage 58 is directly coupled to intake passage 28, downstream of compressor 162. Further, as shown in FIG. 1, second EGR passage 58 is coupled to intake passage 28 upstream of a charge air cooler (CAC) 40. CAC 40 is configured to cool intake air (which may be a mixture of fresh intake air from outside of the engine system and exhaust gases) as it passes through CAC 40. As such, recirculated exhaust gases from first EGR passage 50 and/or second EGR passage 58 may be cooled via CAC 40 before entering intake manifold 44. In an alternate embodiment, second EGR passage 58 may be coupled to intake passage 28, downstream of CAC 40. In this embodiment, there may be no EGR cooler 52 disposed within first EGR passage 50. Further, as shown in FIG. 1, a second ejector 57 may be positioned within intake passage 28, at an outlet of second EGR passage 58.

A second EGR valve 59 is disposed within second EGR passage 58. Second EGR valve 59 is configured to adjust an amount of gas flow (e.g., intake air or exhaust) through second EGR passage 58. As described further below, controller 12 may actuate EGR valve 59 into an open position (allowing flow thorough second EGR passage 58), closed position (blocking flow through second EGR passage 58), or plurality of positions between fully open and fully closed based on (e.g., as a function of) engine operating conditions. For example, actuating the EGR valve 59 may include the controller 12 sending an electronic signal to an actuator of the EGR valve 59 to move a valve plate of EGR valve 59 into an open position, closed position, or some position between fully open and fully closed. As also explained further below, based on system pressures and positions of alternate valves in the engine system, air may either flow toward intake passage 28 within second EGR passage 58 or toward second exhaust manifold 80 within second EGR passage 58.

Intake passage 28 further includes an electronic intake throttle 62 in communication with intake manifold 44. As shown in FIG. 1, intake throttle 62 is positioned downstream of CAC 40. The position of a throttle plate 64 of throttle 62 can be adjusted by control system 15 via a throttle actuator (not shown) communicatively coupled to controller 12. By modulating air intake throttle 62, while operating compressor 162, an amount of fresh air may be inducted from the atmosphere and/or an amount of recirculated exhaust gas from the one or more EGR passages into engine 10, cooled by CAC 40 and delivered to the engine cylinders at compressor (or boosted) pressure via intake manifold 44. To reduce compressor surge, at least a portion of the aircharge compressed by compressor 162 may be recirculated to the compressor inlet. A compressor recirculation passage 41 may be provided for recirculating compressed air from the compressor outlet, upstream of CAC 40, to the compressor inlet. Compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80 and a second end of third flow passage 30 is directly coupled to intake passage 28, downstream of intake throttle 62 and upstream of intake manifold 44. A third valve 32 (e.g., hot pipe valve) is disposed within third flow passage 30 and is configured to adjust an amount of air flow through third flow passage 30. Third valve 32 may be actuated into a fully open position, fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes a pressure sensor 34 and oxygen sensor 36 disposed therein and configured to measure a pressure and oxygen content, respectively, of exhaust gases and blowthrough (e.g., intake) air, exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38.

In some embodiments, as shown in FIG. 1, intake passage 28 may include an electric compressor 60. Electric compressor 60 is disposed in a bypass passage 61 which is coupled to intake passage 28, upstream and downstream of an electric compressor valve 63. Specifically, an inlet to bypass passage 61 is coupled to intake passage 28 upstream of electric compressor valve 63 and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1. When additional boost (e.g., increased pressure of the intake air above atmospheric pressure) is requested, over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1, intake passage 28 includes a mass air flow (MAF) sensor 48 disposed upstream of compressor 162, electric compressor valve 63, and where first EGR passage 59 couples to intake passage 28. An intake pressure sensor 31 and intake temperature sensor 33 are positioned in intake passage 28, upstream of compressor 162 and downstream of where first EGR passage 50 couples to intake passage 28. An intake oxygen sensor 35 and an intake temperature sensor 43 may be located in intake passage 28, downstream of compressor 162 and upstream of CAC 40. An additional intake pressure sensor 37 may be positioned in intake passage 28, downstream of CAC 40 and upstream of throttle 28. In some embodiments, as shown in FIG. 1, an additional intake oxygen sensor 39 may be positioned in intake passage 28, between CAC 40 and throttle 28. Further, an intake manifold pressure (e.g., MAP) sensor 122 and intake manifold temperature sensor 123 are positioned within intake manifold 44, upstream of all engine cylinders.

In some examples, engine 10 may be coupled to an electric motor/battery system (as shown in FIG. 2) in a hybrid vehicle. The hybrid vehicle may have a parallel configuration, series configuration, or variation or combinations thereof. Further, in some embodiments, other engine configurations may be employed, for example a diesel engine.

Engine 10 may be controlled at least partially by a control system 15 including controller 12 and by input from a vehicle operator via an input device (not shown in FIG. 1). Control system 15 is shown receiving information from a plurality of sensors 16 (various examples of which are described herein) and sending control signals to a plurality of actuators 81. As one example, sensors 16 may include pressure, temperature, and oxygen sensors located within the intake passage 28, intake manifold 44, exhaust passage 74, and second exhaust manifold 80, as described above. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 83 may include fuel injectors, valves 63, 42, 54, 59, 32, 97, 76, and throttle 62. Actuators 83 may further include various camshaft timing actuators coupled to the cylinder intake and exhaust valves (as described further below with reference to FIG. 2). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 3. For example, adjusting EGR flow from second exhaust manifold 80 to intake passage 28 may include adjusting an actuator of the BTCC valve 54 to adjust an amount of exhaust flow flowing to intake passage 28, upstream of compressor 162, from second exhaust manifold 80. As another example, adjusting EGR flow from second exhaust manifold 80 to intake passage 28 may include adjusting an actuator of an exhaust valve camshaft to adjust an opening timing of second exhaust valves 6. In another example, adjusting turbine speed may include adjusting the position of the blowdown wastegate 76 to be more open or more closed to modulate the amount of exhaust gas directed to the turbine.

In this way, the blowdown wastegate valve 76 may discharge exhaust gas downstream of the turbine to alleviate boost pressure exceeding boost demand and regulate turbine speed without disrupting balances between cylinders 12, 14, 16, and 18. Equalizing pressure between all cylinders may be achieved independent of actuation of the blowdown wastegate valve 76, via control of residual gases through the second exhaust manifold 80 and adjusting a position of SMBV 97 to control scavenge manifold pressure. The first and second exhaust manifolds of FIG. 1 may be configured to separately channel the blowdown and scavenging portions of the exhaust. First exhaust manifold 84 may channel the blowdown pulse of the exhaust to dual-stage turbine 164 via first manifold portion 81 and second manifold portion 85 while second exhaust manifold 80 may channel the scavenging portion of exhaust to intake passage 28 via one or more of first EGR passage 50 and second EGR passage 58 and/or to exhaust passage 74, downstream of the dual-stage turbine 164, via flow passage 98. For example, first exhaust valves 8 channel the blowdown portion of the exhaust gases through first exhaust manifold 84 to the dual-stage turbine 164 and both first and second emission control device 70 and 72 while second exhaust valves 6 channel the scavenging portion of exhaust gases through second exhaust manifold 80 and to either intake passage 28 via one or more EGR passages or exhaust passage 74 and second emission control device 72 via flow passage 98.

By coupling BDWG 76 to one of the first exhaust runners 87 of the first exhaust manifold via bypass 78, a portion of the blowdown exhaust gas may be diverted to exhaust passage 74, bypassing dual-stage turbine 164. The amount of exhaust gas driving rotation of dual-stage turbine 164, and thus compressor 162, may be adjusted by opening, or partially opening, BDWG 76. Since BDWG 76 is exposed to hot exhaust gases from only a portion of the cylinders, it is periodically not being exposed to hot exhaust gas. Additionally, it may be situated in a cooler location such as the water-cooled cylinder head to further reduce the temperature of the valve. This allows BDWG 76 to be formed from a more inexpensive material such as aluminum, thereby lowering the overall cost of the engine system. The configuration of the BDWG 76 of FIG. 1 further contributes to a reduction in components, e.g. material mass, positioned between first exhaust manifold 84 and first and second emissions control devices 70, 72. By reducing the material mass, an amount of heat conductive material is decreased that may otherwise absorb heat that is transferred to the first and second emissions control devices 70, 72 from hot exhaust gas flowing through the first exhaust manifold 84 through dual-stage turbine 164. As a result, the period for thermal activation of the catalysts may be shortened.

It should be noted that while FIG. 1 shows engine 10 including each of first EGR passage 50, second EGR passage 58, flow passage 98, and flow passage 30, in alternate embodiments, engine 10 may only include a portion of these passages. For example, in one embodiment, engine 10 may only include first EGR passage 50 and flow passage 98 and not include second EGR passage 58 and flow passage 30. In another embodiment, engine 10 may include first EGR passage 50, second EGR passage 58, and flow passage 98, but not include flow passage 30. In yet another embodiment, engine 10 may include first EGR passage 50, flow passage 30, and flow passage 98, but not second EGR passage 58. In some embodiments, engine 10 may not include electric compressor 60. In still other embodiments, engine 10 may include all or only a portion of the sensors shown in FIG. 1.

Referring now to FIG. 2, it depicts a partial view of a single cylinder of internal combustion engine 10 which may be installed in a vehicle 100. As such, components previously introduced in FIG. 1 are represented with the same reference numbers and are not re-introduced. Engine 10 is depicted with combustion chamber (cylinder) 130, coolant sleeve 114, and cylinder walls 132 with piston 136 positioned therein and connected to crankshaft 140. Combustion chamber 130 is shown communicating with intake passage 146 and exhaust passage 148 via respective intake valve 152 and exhaust valve 156. As previously described in FIG. 1, each cylinder of engine 10 may exhaust combustion products along two conduits. In the depicted view, exhaust passage 148 represents the first exhaust runner (e.g., port) leading from the cylinder to the turbine (such as first exhaust runner 87 of FIG. 1) while the second exhaust runner is not visible in this view. As such, exhaust passage 148 may be coupled to a bypass configured with a blowdown wastegate, such as bypass 78 and blowdown wastegate valve 76 of FIG. 1, fluidly coupling exhaust passage 148 to a common exhaust passage, such as exhaust passage 74 of FIG. 1.

As also previously elaborated in FIG. 1, each cylinder of engine 10 may include two intake valves and two exhaust valves. In the depicted view, intake valve 152 and exhaust valve 156 are located at an upper region of combustion chamber 130. Intake valve 152 and exhaust valve 156 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 152 is controlled by an intake cam 151 and each exhaust valve 156 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivated the exhaust valve 156 such that it remains closed and does not open at its set timing. The position of intake camshaft 151 and exhaust camshaft 153 may be determined by camshaft position sensors 155 and 157, respectively. As introduced above, in one example, all exhaust valves of every cylinder may be controlled on a same exhaust camshaft. As such, both a timing of the scavenge (second) exhaust valves and the blowdown (first) exhaust valves may be adjusted together via one camshaft, but they may each have different timings relative to one another. In another example, the scavenge exhaust valve of every cylinder may be controlled on a first exhaust camshaft and a blowdown exhaust valve of every cylinder may be controlled on a different, second exhaust camshaft. In this way, the valve timing of the scavenge valves and blowdown valves may be adjusted separately from one another. In alternate embodiments, the cam or valve timing system(s) of the scavenge and/or blowdown exhaust valves may employ a cam in cam system, an electro-hydraulic type system on the scavenge valves, and/or an electro-mechanical valve lift control on the scavenge valves.

For example, in some embodiments, the intake and/or exhaust valve may be controlled by electric valve actuation. For example, cylinder 130 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at higher exhaust pressure. For example, a first exhaust cam profile can open from closed position the first exhaust valve (e.g., blowdown valve) just before BDC (bottom dead center) of the power stroke of combustion chamber 130 and close the same exhaust valve well before top dead center (TDC) to selectively exhaust blowdown gases from the combustion chamber. Further, a second exhaust cam profile can be positioned to open from close a second exhaust valve (e.g., scavenge valve) before a mid-point of the exhaust stroke and close it after TDC to selectively exhaust the scavenging portion of the exhaust gases.

Thus, the timing of the first exhaust valve and the second exhaust valve can isolate cylinder blowdown gases from a scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine(s) and a higher pressure exhaust passage and flowing a later, second portion of the exhaust gas (e.g., lower pressure exhaust) and blowthrough air to the compressor inlet, the engine system efficiency is improved. Turbine energy recovery may be enhanced and engine efficiency may be improved via increased EGR and reduced knock.

Continuing with FIG. 2, exhaust gas sensor 126 is shown coupled to exhaust passage 148. Sensor 126 may be positioned in the exhaust passage upstream of one or more emission control devices, such as devices 70 and 72 of FIG. 1. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, GPF, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 130 can have a compression ratio, which is the ratio of volumes when piston 136 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 92 for initiating combustion. Ignition system 188 can provide an ignition spark to combustion chamber 130 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including one fuel injector 66. Fuel injector 66 is shown coupled directly to combustion chamber 130 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 130. While FIG. 2 shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof etc. In some embodiments, fuel system 180 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 113 via an input device 118 such as an accelerator pedal 116. The input device 118 sends a pedal position signal to controller 12. Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 112 coupled to coolant sleeve 114; a profile ignition pickup signal (PIP) from Hall effect sensor 120 (or other type) coupled to crankshaft 140; throttle position (TP) from a throttle position sensor; absolute manifold pressure signal (MAP) from sensor 122, cylinder AFR from EGO sensor 126, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 92, intake/ exhaust valves and cams, etc. The controller may receive input data from the various sensors, process the input data, and trigger the actuators in response to the processed input data based on instruction or code programmed therein corresponding to one or more routines.

In some examples, vehicle 100 may be a hybrid vehicle with multiple sources of torque available to one or more vehicle wheels 160. In other examples, vehicle 100 is a conventional vehicle with only an engine. In the example shown in FIG. 2, vehicle 100 includes engine 10 and an electric machine 161. Electric machine 161 may be a motor or a motor/generator and thus may also be referred to herein as an electric motor. Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Electric machine 161 receives electrical power from a traction battery 170 to provide torque to vehicle wheels 160. Electric machine 161 may also be operated as a generator to provide electrical power to charge battery 170, for example during a braking operation.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 3:
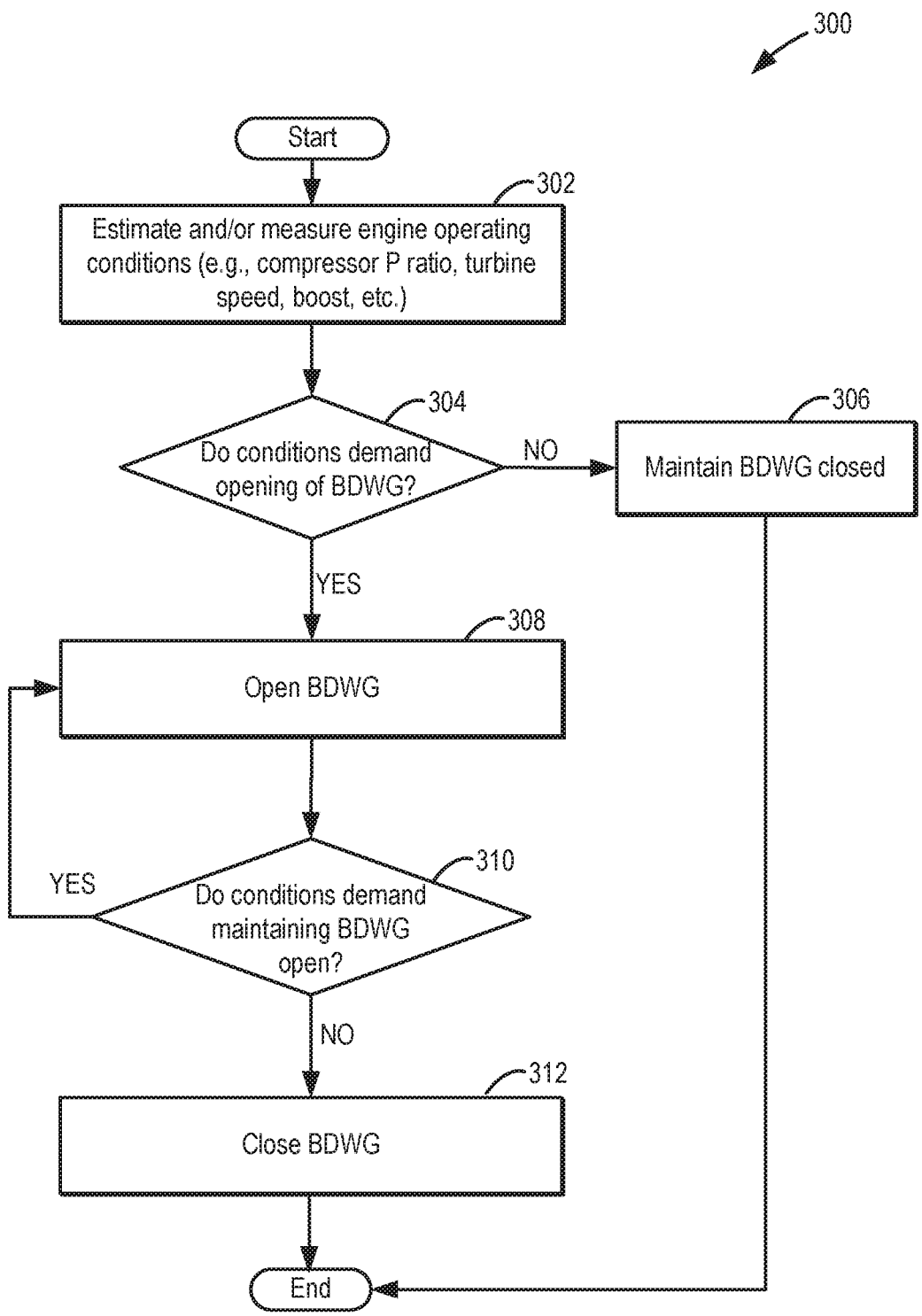
FIG. 3 shows a flowchart depicting the operation of a blowdown wastegate in a turbocharged engine system with a split exhaust system.

Turning now to FIG. 3, an example routine for operation of a blowdown wastegate valve (BDWG), such as the BDWG 76 of FIG. 1, is shown. In one embodiment, the default position of the BDWG is a closed position and the BDWG remains closed until certain engine operating conditions lead to a controller generating a signal for opening of the BDWG, as described herein. Instructions for carrying out method 300 and the rest of the methods included herein may be executed by a controller (such as controller 12 shown in FIGS. 1 and 2) based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below. As one example, the controller may send a control signal to an actuator of the BDWG to increase opening (e.g., open) or decrease opening (e.g., close) of the BDWG in response to signals received from various sensors of the engine system, such as signals indicating engine load, a temperature of the compressor, a speed (e.g., rotational speed) of the compressor, turbine, and/or turbocharger, boost demand, etc.

At 302 the method includes estimating and/or measuring engine operating conditions such as engine speed and/or load, operator torque demand, manifold absolute pressure, manifold air flow, boost pressure, compressor pressure ratios, turbine speed, etc. For example, boost pressure may be determined from a pressure sensor downstream of a charge-air cooler in an intake passage, such as intake pressure sensor 37 of FIG. 1. As another example, a pressure ratio across a turbocharger compressor may be calculated based on measurements received from a pressure sensor upstream of the compressor inlet and a pressure sensor downstream of the compressor outlet, such as intake pressure sensors 31 and 43 of FIG. 1.

At 304, the method includes determining if operating conditions of the engine leading to opening of the BDWG are met. For example, opening of the BDWG may be commanded based on the turbocharger compressor speed, as determined by monitoring of turbine or turbocharger speed, increasing above a threshold speed. The threshold speed may be a speed set within a memory of the controller and above which the compressor may be degraded or performance of the compressor may be reduced. The threshold speed may be similar to or the same as a threshold turbine speed above which degradation of the turbine may result. Compressor speed rising above the threshold speed may occur during high engine loads when a throttle, such as throttle 62 of FIG. 1, is in an open position. As engine load increases, compressor speed may also increase due to a higher rotational speed of the turbine, driven by exhaust gas.

The BDWG may be at least partially opened to direct a portion of the exhaust gas from a blowdown manifold, such as the blowdown manifold 84 of FIG. 1, from an exhaust runner of the blowdown manifold to an exhaust passage, at a region between a first and second emission control device. Before the BDWG is opened, a BTCC valve, such as the BTCC valve 54 of FIG. 1, may be closed to decrease gas flow to the compressor and a SMBV, such as SMBV 97 of FIG. 1, is opened to maintain a low pressure of a scavenge manifold, e.g., the scavenge manifold 80 of FIG. 1. In another example, closing the BTCC and opening the SMBV may include decreasing the amount of opening of the BTCC valve (without fully closing) and increasing the amount of opening of the SMBV (without fully opening). The amount of decreasing and increasing the openings of the BTCC and SMBV may be based on a desired scavenge manifold pressure, where the desired scavenge manifold pressure is based on the intake manifold pressure and a timing of intake and exhaust valves. As such, a timing of scavenge exhaust valves (e.g., second exhaust valves 6 of FIG. 1) may be advanced, as a desired blowthrough amount to the exhaust passage decreases. The BDWG is opened, venting a portion of the exhaust gas in the blowdown manifold to the exhaust passage, upstream of the second emission control device, decreases exhaust gas pressure in the manifold, thereby decreasing turbine and turbocharger speed.

As another example, opening of the BDWG may be desired when (and commanded by the controller in response to) a temperature of the compressor outlet reaches a temperature threshold, which may occur during higher engine loads. As engine load increases, compressor outlet temperature may also increase due to faster turbine speed, as driven by exhaust gas. The compressor outlet temperature (e.g., a temperature of gases exiting the turbocharger compressor) may be measured via a temperature sensor positioned downstream of or at the outlet of the compressor, such as temperature sensor 43 of FIG. 1. In other examples, the compressor outlet temperature may be estimated based on various other sensor outputs and engine operating conditions, such as the compressor inlet temperature and a rotational speed of the compressor.

The temperature threshold may be a temperature above which degradation to the compressor may occur. The temperature threshold may be related to a turbine speed threshold. For example, a turbine speed over the speed threshold may result in the compressor outlet temperature increasing to or above the compressor outlet temperature threshold. In response to a compressor outlet temperature reaching the temperature threshold, the BTCC valve may be modulated to reduce the amount of exhaust flow to the compressor inlet from the scavenge manifold. In one example, modulating the BTCC valve may include switching the BTCC valve between fully open and fully closed positions to reduce exhaust gas flow to the compressor inlet via the EGR passage. Modulating the BTCC valve may also include increasing a duration that the BTCC valve is closed compared to a duration that the BTCC valve is opened. An amount of modulating may be based on the compressor outlet temperature and/or a desired EGR flow amount.

The BDWG may be opened, or at least partially opened, in response to the compressor outlet temperature reaching the temperature threshold, in order to reduce the speed of the turbine, thereby reducing the speed of the compressor. Reducing the speed of the compressor results in a decrease of the compressor outlet temperature due to lessened compression and heating of gases by the compressor.

As another example, the conditions for opening the BDWG may also include a determined (e.g., measured) boost pressure (downstream of or at the compressor) being greater than a boost demand, as determined based on the operator torque demand. As yet another example, opening of the BDWG may be executed responsive to engine load being above a threshold load.

Returning to 304 of the method, if the engine operating conditions determined at the controller based on signals received from the various engine sensors do not demand opening of the BDWG, the method proceeds to 306 to maintain the BDWG closed. For example, if the compressor speed is below the speed threshold and the compressor outlet temperature is below the temperature threshold, the controller may maintain the BDWG closed by not sending an actuation signal to the actuator of the BDWG to open the valve.

Alternatively at 304, if one or more of the conditions described above for opening the BDWG are met, the method may proceed to 308 to open or at least partially open (e.g., increase the amount of opening) of the BDWG. For example, the controller may command increasing the opening of the BDWG (via sending an actuation signal to the actuator of the BDWG to increase the amount of opening or fully open the BDWG) based on detection of turbocharger speed above the speed threshold, the temperature of the compressor outlet rising above the temperature threshold, or an engine load increasing above a threshold load, as detected by pressure, temperature, and mass flow sensors, as described at FIG. 1. Upon receiving data from the sensors, the controller may refer to data stored in look-up tables or one or more threshold values stored in the memory of the controller to determine the desired position or amount of opening of the BDWG. As one example, at 308, the controller may send an actuation signal to the actuator of the BDWG to open, or at least partially open (e.g., increase the amount of opening), the BDWG. This may result in at least a portion of exhaust gas from one blowdown exhaust runner to bypass the turbine. As a result, turbocharger speed may be decreased. For example, in response to the compressor speed reaching or increasing above the speed threshold or the compressor outlet temperature rising to the temperature threshold, the method continues to 308 and the BDWG is opened.

At 310, the method includes determining if current engine operating conditions demand maintaining the BDWG open. For example, if the compressor speed is still at or above the speed threshold and/or the compressor outlet temperature is still at or above the temperature threshold, the method returns to 308, maintaining the BDWG open (or partially open). In another example, if the controller determines that the engine operating conditions with the BDWG in the current open (or partially open) position are preferred to the conditions that would occur if the valve were closed, the method may return to 308 to maintain the wastegate in an open or partially open position. The new open (or partially open) position may be more or less open than the previous position. Alternatively, if the engine operating conditions change such that conditions for opening the BDWG are not met, the method then proceeds to 312 to close the BDWG. For example, if the compressor speed is determined (e.g., by the controller based on signals received from one or more engine sensors) to be below the speed threshold and the compressor outlet temperature is measured to be below the temperature threshold, the method proceeds to 312 to close the BDWG. In one example, the method at 312 may include the controller sending an electrical signal to the actuator of the BDWG to close the BDWG and block exhaust gas flow from the blowdown exhaust runner that the BDWG is coupled to and to the exhaust passage, downstream of the turbine. As a result, turbocharger speed may increase.

In this way, a split exhaust engine may be configured with a blowdown wastegate branching from one (e.g., only one) exhaust runner of a blowdown manifold that directs high pressure exhaust gas from exhaust valves of the engine cylinders to an exhaust turbine. The blowdown wastegate couples the exhaust runner to an exhaust passage, downstream of a turbine. In one example, the blowdown wastegate may bypass exhaust gas from the exhaust runner around the turbine. The blowdown wastegate may be spaced away from the turbine such that the turbine and wastegate valve are not attached to one another, do not share any part of a housing, and conductive heat transfer does not occur between the two components. By positioning the blowdown wastegate away from the turbine, the wastegate may be reduced in size and formed from a different, lower cost material than the turbine housing, thereby adding flexibility to an arrangement of the split exhaust engine within a front compartment of a vehicle. A function of the split exhaust engine may not be affected by disposing the blowdown wastegate along a single exhaust runner of the blowdown manifold due to a balancing of cylinder pressures by a scavenge manifold. Furthermore, a period for catalyst light-off at the second emission control device, downstream of the blowdown wastegate in the exhaust passage, may be shortened, improving an efficiency of exhaust gas treatment before release to the environment. The technical effect of coupling the blowdown wastegate to a single exhaust runner (out of a plurality of exhaust runners, where the single exhaust runner is coupled to a single cylinder) of the blowdown manifold in a split-exhaust engine system is that a likelihood of engine knock is reduced while efficiency of the emission control device is increased and degradation of the turbocharger compressor is reduced.

In one embodiment, a system for an engine includes a first set of exhaust valves fluidly coupled to an exhaust passage including a turbocharger turbine, upstream of the turbocharger turbine, via a plurality of exhaust runners, a wastegate valve positioned in a passage coupled between a single exhaust runner of the plurality of exhaust runners and the exhaust passage, downstream of the turbocharger turbine, and a second set of exhaust valves fluidly coupled to an intake passage. A first example of the system includes coupling each exhaust valve of the first set of exhaust valves to a different engine cylinder of a plurality of engine cylinders, wherein each exhaust valve is coupled to a different exhaust runner of the plurality of exhaust runners, and wherein the passage including the wastegate valve is only coupled to the single exhaust runner and not any other exhaust runner of the plurality of exhaust runners. A second example of the system optionally includes the first example, and further includes wherein each engine cylinder of the plurality of engine cylinders includes one exhaust valve of the first set of exhaust valves and one exhaust valve of the second set of exhaust valves. A third example of the system optionally includes one or more of the first and second examples, and further includes, a first emission control device and second emission control device disposed within the exhaust passage, downstream of the turbocharger turbine, the second emission control device positioned downstream of the first emission control device. A fourth example of the system optionally includes one or more of the first through third examples, and further includes, wherein the passage including the wastegate valve is coupled to the exhaust passage. A fifth example of the system optionally includes one or more of the first through fourth examples, and further includes, wherein the second set of exhaust valves are fluidly coupled to the exhaust passage. A sixth example of the system optionally includes one or more of the first through fifth examples, and further includes, wherein the second set of exhaust valves are fluidly coupled to the intake passage, upstream of a turbocharger compressor, the turbocharger compressor rotationally coupled to the turbocharger turbine via a shaft. A seventh example of the system optionally includes one or more of the first through sixth examples, and further includes, a controller with computer readable instructions stored in memory for: increasing an amount of opening of the wastegate valve in response to one or more of: an increase in speed of the turbocharger turbine or turbocharger compressor over a threshold speed, an increase in temperature of the turbocharger compressor over a threshold temperature, and a decrease in engine load below a threshold load. An eighth example of the system optionally includes one or more of the first through seventh examples, and further includes, wherein the wastegate valve is spaced away from the turbocharger turbine and is composed of a more inexpensive material than the turbocharger turbine.

As another embodiment, a system for an engine includes a first exhaust manifold fluidly coupling a first set of exhaust valves to an exhaust passage, upstream of a turbocharger turbine, a first emission control device (ECD), and a second ECD disposed within the exhaust passage, the second ECD positioned downstream of the first ECD, via a first set of exhaust runners, a second exhaust manifold fluidly coupling a second set of exhaust valves to an intake passage, upstream of a turbocharger compressor and a bypass passage including a wastegate valve, the bypass passage coupling a single exhaust runner of the first set of exhaust runners to the exhaust passage, downstream of the turbocharger. A first example of the system includes the first exhaust manifold and the second exhaust manifold not directly fluidly coupled to one another. A second example of the system optionally includes the first example and further includes wherein a scavenge passage fluidly couples the second exhaust manifold to the exhaust passage, the scavenge passage including an actuatable valve. A third example of the system optionally includes one or more of the first and second examples, and further includes, wherein the scavenge passage couples the second exhaust manifold to the exhaust passage at a same region of the exhaust passage as where the bypass passage couples the single exhaust runner of the first set of exhaust runners to the exhaust passage. A fourth example of the system optionally includes one or more of the first through third examples, and further includes, wherein the first set of exhaust valves are controlled at a different timing than the second set of exhaust valves. A fifth example of the system optionally includes one or more of the first through fourth examples, and further includes, wherein the wastegate valve is adjustable between an open and a closed position, wherein in the closed position all exhaust gas from the first set of exhaust valves is directed to the turbocharger turbine to drive a rotation of the turbine. A sixth example of the system optionally includes one or more of the first through fifth examples, and further includes, wherein in the open position at least a portion of exhaust gas from the single exhaust runner is directed to the exhaust passage, and all exhaust gas from remaining exhaust runners of the first set of exhaust runners is directed to the turbocharger turbine. A seventh example of the system optionally includes one or more of the first through sixth examples, and further includes, wherein the wastegate valve is positioned away from a housing of the turbocharger turbine and wherein a portion of the single exhaust runner of the first set of exhaust runners is arranged between the wastegate valve and the turbocharger turbine.

As another embodiment, a method for an engine includes via a first set of exhaust runners, flowing exhaust gas from a first set of exhaust valves to a turbocharger turbine, an upstream, first catalyst, and a downstream, second catalyst disposed in an exhaust passage, during the flowing exhaust gas from the first set of exhaust valves to the turbocharger turbine, flowing at least a portion of exhaust gas from only a single exhaust valve of the first set of exhaust valves to the exhaust passage, and not to the turbocharger turbine, and flowing a first portion of exhaust gas from a second set of exhaust valves to an intake passage. A first example of the method includes flowing a remaining, second portion of exhaust gas from the second set of exhaust valves to the exhaust passage. A second example of the method optionally includes the first example and further includes wherein flowing at least the portion of exhaust gas from only the single exhaust valve of the first set of exhaust valves to the exhaust passage, and not to the turbocharger turbine includes opening a wastegate valve disposed in a bypass passage coupled between a single exhaust runner of the first set of exhaust runners and the exhaust passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a first set of exhaust valves fluidly coupled to an exhaust passage including a turbocharger turbine, upstream of the turbocharger turbine, via a plurality of exhaust runners;
a wastegate valve positioned in a passage coupled between a single exhaust runner of the plurality of exhaust runners and the exhaust passage, downstream of the turbocharger turbine, the passage including the wastegate valve only fluidly coupled to the single exhaust runner and not fluidly coupled to any other exhaust runner of the plurality of exhaust runners; and a second set of exhaust valves fluidly coupled to an intake passage.

2. The system of claim 1, wherein each exhaust valve of the first set of exhaust valves is coupled to a different engine cylinder of a plurality of engine cylinders, wherein each exhaust valve is coupled to a different exhaust runner of the plurality of exhaust runners.

3. The system of claim 2, wherein each engine cylinder of the plurality of engine cylinders includes one exhaust valve of the first set of exhaust valves and one exhaust valve of the second set of exhaust valves, wherein the plurality of exhaust runners is a first plurality of exhaust runners, wherein the single exhaust runner is coupled to a first exhaust valve of the first set of exhaust valves, the first exhaust valve coupled to a first engine cylinder of the plurality of engine cylinders, wherein the first engine cylinder is coupled to a second exhaust valve of the second set of exhaust valves, and wherein the second exhaust valve is coupled to the intake passage via an exhaust runner of a second plurality of exhaust runners.

4. The system of claim 1, further comprising a first emission control device and a second emission control device disposed within the exhaust passage, downstream of the turbocharger turbine, the second emission control device positioned downstream of the first emission control device.

5. The system of claim 4, wherein the passage including the wastegate valve is coupled to the exhaust passage downstream of the first emission control device and upstream of the second emission control device.

6. The system of claim 5, wherein the second set of exhaust valves is fluidly coupled to the exhaust passage.

7. The system of claim 1, wherein the second set of exhaust valves is fluidly coupled to the intake passage, upstream of a turbocharger compressor, the turbocharger compressor rotationally coupled to the turbocharger turbine via a shaft.

8. The system of claim 7, further comprising a controller with computer readable instructions stored in memory for: increasing an amount of opening of the wastegate valve in response to one or more of: an increase in speed of the turbocharger turbine or the turbocharger compressor over a threshold speed, an increase in temperature of the turbocharger compressor over a threshold temperature, and a decrease in engine load below a threshold load.

9. The system of claim 1, wherein the wastegate valve is spaced away from the turbocharger turbine and is composed of a more inexpensive material than the turbocharger turbine.

10. A system for an engine, comprising:
a first exhaust manifold fluidly coupling a first set of exhaust valves to an exhaust passage via a first set of exhaust runners, the exhaust manifold fluidly coupling the first set of exhaust valves to the exhaust passage upstream of a turbocharger turbine, a first emission control device (ECD), and a second ECD disposed within the exhaust passage, the second ECD positioned downstream of the first ECD;

a second exhaust manifold fluidly coupling a second set of exhaust valves to an intake passage, upstream of a turbocharger compressor; and a bypass passage including a wastegate valve, the bypass passage coupling a single exhaust runner of the first set of exhaust runners to the exhaust passage, downstream of the turbocharger turbine, the bypass passage including an inlet coupled to the single exhaust runner upstream of a junction at which the single exhaust runner couples with at least one other exhaust runner of the first set of exhaust runners, and exhaust gas that travels through the bypass passage to the exhaust passage downstream of the turbocharger turbine bypasses the first exhaust manifold.

11. The system of claim 10, wherein the first exhaust manifold and the second exhaust manifold are not directly fluidly coupled to one another.

12. The system of claim 10, wherein a scavenge passage fluidly couples the second exhaust manifold to the exhaust passage, the scavenge passage including an actuatable valve.

13. The system of claim 12, wherein the scavenge passage couples the second exhaust manifold to the exhaust passage at a same region of the exhaust passage as where the bypass passage couples the single exhaust runner of the first set of exhaust runners to the exhaust passage.

14. The system of claim 10, wherein the first set of exhaust valves is controlled at a different timing than the second set of exhaust valves.

15. The system of claim 10, wherein the wastegate valve is adjustable between an open and a closed position, wherein in the closed position all exhaust gas from the first set of exhaust valves is directed to the turbocharger turbine via the junction to drive a rotation of the turbocharger turbine.

16. The system of claim 15, wherein in the open position at least a portion of exhaust gas from the single exhaust runner is directed to the exhaust passage via the bypass passage, bypassing the turbocharger turbine, and all exhaust gas from remaining exhaust runners of the first set of exhaust runners is directed to the turbocharger turbine.

17. The system of claim 10, wherein the wastegate valve is positioned away from a housing of the turbocharger turbine and wherein a portion of the single exhaust runner of the first set of exhaust runners is arranged between the wastegate valve and the turbocharger turbine.

* * * * *